US012809603B2

(12) United States Patent
Poyarekar

(10) Patent No.: US 12,809,603 B2
(45) Date of Patent: Nov. 24, 2026

(54) OBJECT SIZE ANNOTATIONS FOR MEMORY SAFETY

(71) Applicant: Red Hat, Inc., Raleigh, NC (US)

(72) Inventor: Siddhesh Poyarekar, Toronto (CA)

(73) Assignee: Red Hat, LLC, Raleigh, NC (US)

( * ) Notice: Subject to any disclaimer, the term of this patent is extended or adjusted under 35 U.S.C. 154(b) by 388 days.

(21) Appl. No.: 18/540,285

(22) Filed: Dec. 14, 2023

(65) Prior Publication Data

US 2025/0199784 A1 Jun. 19, 2025

(51) Int. Cl.
*G06F 8/41* (2018.01)
*G06F 8/73* (2018.01)

(52) U.S. Cl.
CPC .............. *G06F 8/443* (2013.01); *G06F 8/427* (2013.01); *G06F 8/434* (2013.01); *G06F 8/73* (2013.01)

(58) Field of Classification Search
CPC ....................................................... G06F 8/443
See application file for complete search history.

(56) References Cited

U.S. PATENT DOCUMENTS 7,133,993 B1 * 11/2006 Jackson ................ G06F 8/4434 711/170
7,281,237 B2 * 10/2007 de Jong .............. G06F 9/44589 717/126
8,484,613 B2 * 7/2013 Somakumar ........ G06F 11/3604 717/110
8,533,695 B2 * 9/2013 Harvey ................... G06F 8/437 717/146
9,021,455 B2 * 4/2015 Chapman ............ G06F 9/45516 717/158
9,530,006 B2 * 12/2016 Troeger ................ G06F 21/577
10,140,105 B2 * 11/2018 Kellicker .................. G06F 8/51

(Continued)

FOREIGN PATENT DOCUMENTS

CN 114041117 A * 2/2022 ......... G06F 16/9024
EP 2622466 B1 * 4/2019 ............... G06F 9/30
ES 2733516 T3 * 11/2019 ............... G06F 9/06

OTHER PUBLICATIONS

Monteiro, Susana, and Nuno Lopes. "Static Analysis for C++ Rust-Like Lifetime Annotations." (2023).*

(Continued)

*Primary Examiner* — Francisco J Aponte
(74) *Attorney, Agent, or Firm* — Dority & Manning, P.A.

(57) ABSTRACT

A computing device accesses a source code instruction file comprising source code instructions written to comply with a predetermined programming language syntax, wherein a compiler is operable to generate an executable file based on the source code instruction file. The computing device identifies, based on the source code instruction file, an annotation that identifies object size verification instructions that, when executed and passed a reference to an object that is defined by the source code instructions, returns a memory size of the object. The computing device identifies source code instructions that access the object. The computing device injects, in the executable file, executable instructions that cause the object size verification instructions to be executed to determine the memory size of the object and condition the access to the object on a value returned by the object size verification instructions.

20 Claims, 7 Drawing Sheets

(56) References Cited

U.S. PATENT DOCUMENTS

| | | | | |
|---|---|---|---|---|
| 10,691,434 | B2 * | 6/2020 | Shah | G06F 8/315 |
| 11,023,214 | B2 * | 6/2021 | Poon | G06F 8/425 |
| 11,048,489 | B2 * | 6/2021 | Buckley | G06F 8/20 |
| 11,188,639 | B2 * | 11/2021 | LeMay | G06F 8/41 |
| 11,449,410 | B2 * | 9/2022 | Hong | G06F 11/3612 |
| 12,436,749 | B2 * | 10/2025 | Cockerham | G06F 8/437 |
| 2008/0155521 | A1 * | 6/2008 | Uola | G06F 9/44578 717/166 |
| 2011/0185341 | A1 * | 7/2011 | Somakumar | G06F 11/004 717/110 |
| 2014/0047419 | A1 * | 2/2014 | Gaster | G06F 8/42 717/141 |
| 2016/0062753 | A1 * | 3/2016 | Champagne | G06F 8/51 717/137 |
| 2018/0275977 | A1 * | 9/2018 | Kudriavtsev | G06F 8/51 |
| 2020/0241857 | A1 * | 7/2020 | Morris | G06F 8/51 |
| 2020/0364036 | A1 * | 11/2020 | De Smet | G06F 8/427 |
| 2021/0389946 | A1 * | 12/2021 | Wilkerson | G06F 9/5044 |
| 2022/0357934 | A1 * | 11/2022 | Ling | G06F 8/425 |
| 2023/0251838 | A1 * | 8/2023 | Drepper | G06F 8/443 717/153 |
| 2024/0095024 | A1 * | 3/2024 | Özen | G06F 8/71 |
| 2025/0199785 | A1 * | 6/2025 | Zhou | G06F 9/45504 |

OTHER PUBLICATIONS

Zhang, Huaien, et al. "Understanding and detecting annotation-induced faults of static analyzers." Proceedings of the ACM on Software Engineering 1.FSE (2024): 722-744.*

Chen, Zhe, et al. "A source-level instrumentation framework for the dynamic analysis of memory safety." IEEE Transactions on Software Engineering 49.4 (2022).*

Author Unknown, "A GNU Manual—Common Function Attributes," GCC, the GNU Compiler Collection, https://gcc.gnu.org/onlinedocs/gcc/Common-Function-Attributes.html, accessed online Nov. 27, 2023, 28 pages.

Neumann, Thomas, "P2771R0, Towards memory safety in C++," Open Standards, https://www.open-std.org/jtc1/sc22/wg21/docs/papers/2023/p2771r0.html, Jan. 17, 2023, 11 pages.

* cited by examiner

OBJECT SIZE ANNOTATIONS FOR MEMORY SAFETY

BACKGROUND

Compilers are computer programs that generate machine-readable executable code from higher lever source code instructions that are written to comply with a particular programming language syntax.

SUMMARY

The examples disclosed herein implement a compiler that uses object size annotations for memory safety. In particular, the compiler can identify an annotation in a source code file written in a programming language, the annotation identifying a function in the source code file that returns a size of an object. The compiler can generate executable instructions in an executable file that cause the function to execute and return the size of the object, which can be used to verify whether accesses to the object is memory safe.

In one example, a method for object size annotations for memory safety is provided. The method includes accessing, by a compiler executing on a computing device, a source code instruction file comprising source code instructions written to comply with a predetermined programming language syntax, the compiler operable to generate an executable file based on the source code instruction file. The method further includes identifying, by the compiler based on the source code instruction file, an annotation that identifies object size verification instructions that, when executed and passed a reference to an object that is defined by the source code instructions, returns a memory size of the object. The method further includes identifying, by the compiler, source code instructions that access the object. The method further includes injecting, by the compiler, in the executable file, executable instructions that cause the object size verification instructions to be executed to determine the memory size of the object and condition the access to the object on a value returned by the object size verification instructions.

In another example, a computing device for object size annotations for memory safety is provided. The computing device includes a memory and a processor device coupled to the memory. The processor device is to access a source code instruction file comprising source code instructions written to comply with a predetermined programming language syntax, wherein a compiler is operable to generate an executable file based on the source code instruction file. The processor device is further to identify, based on the source code instruction file, an annotation that identifies object size verification instructions that, when executed and passed a reference to an object that is defined by the source code instructions, returns a memory size of the object. The processor device is further to identify source code instructions that access the object. The processor device is further to inject, in the executable file, executable instructions that cause the object size verification instructions to be executed to determine the memory size of the object and condition the access to the object on a value returned by the object size verification instructions.

In another example, a non-transitory computer-readable storage medium for object size annotations for memory safety is provided. The non-transitory computer-readable storage medium includes computer-executable instructions to cause a processor device to access a source code instruction file comprising source code instructions written to comply with a predetermined programming language syntax, wherein a compiler is operable to generate an executable file based on the source code instruction file. The instructions further cause the processor device to identify, based on the source code instruction file, an annotation that identifies object size verification instructions that, when executed and passed a reference to an object that is defined by the source code instructions, returns a memory size of the object. The instructions further cause the processor device to identify source code instructions that access the object. The instructions further cause the processor device to inject, in the executable file, executable instructions that cause the object size verification instructions to be executed to determine the memory size of the object and condition the access to the object on a value returned by the object size verification instructions.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
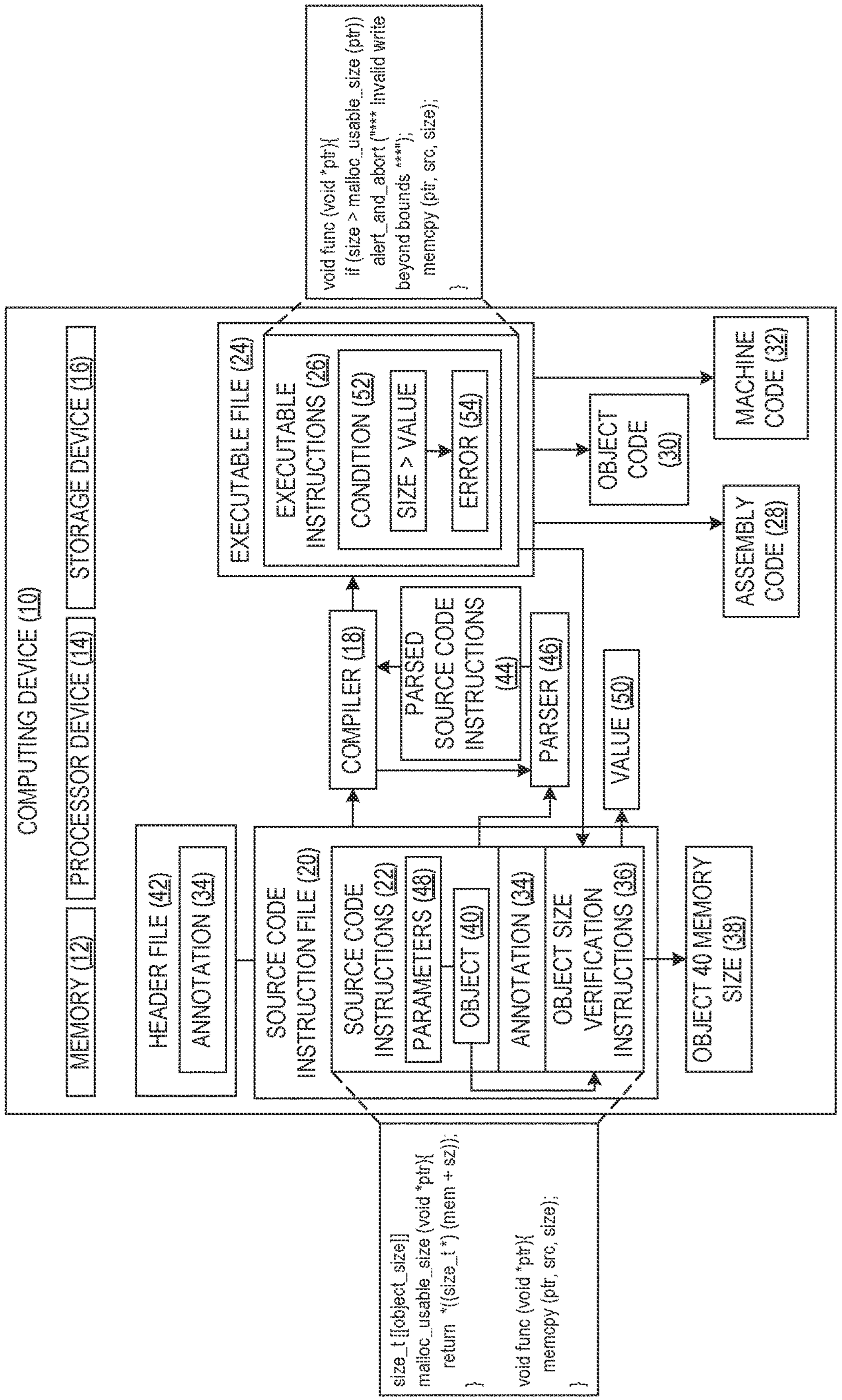
FIG. 1 is a block diagram of a computing device in which examples of object size annotations for memory safety may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the elements unless otherwise explicitly specified. The word "or" as used herein and in the claims is inclusive unless contextually impossible. As an example, the recitation of A or B means A, or B, or both A and B. The word "data" may be used herein in the singular or plural depending on the context.

Compilers are computer programs that generate machine-readable executable code from higher lever source code instructions that are written to comply with a particular programming language syntax. Some programming languages, such as the C and C++ programming languages, have limited guarantees for memory safety, which can result in memory safety bugs that can be exploited by a bad actor, such as with a buffer overflow attack.

The examples disclosed herein implement a compiler that uses object size annotations for memory safety. The compiler can be used to get the size of objects in a computer program to determine whether access to the objects is memory safe. In particular, the compiler can identify an annotation in a source code file written in a programming language, the annotation identifying a function in the source code file that returns a size of an object. The compiler can generate executable instructions in an executable file that cause the function to execute and return the size of the object, which can be used to verify whether accesses to the object is memory safe (i.e., whether the accesses to the object are within the bounds of the memory based on the size of the object), improving the security of the computer program as a result.

For instance, a developer of the computer program can add the annotation to a function in the source code that returns the memory size of an object that is passed to the function. The compiler can identify the annotation that the developer added and determine an accurate estimate or exact size for the memory of the object, which is returned by the function, to improve the memory safety since the compiler can use the memory size of the object to identify the accessible memory bounds of the object. For example, the compiler can use the memory size of the object to write executable instructions that return a warning or error when there is an access beyond the memory bounds of the object.

By determining an accurate estimate or exact size for the memory of an object that is passed to a function in the source code using the annotations, applications and runtime libraries can provide nearly complete coverage of object size tracking across computer programs. As a result, the amount of security issues in a computer program can be reduced by providing memory safety and actions such as compiler warnings and runtime mitigation checks.

FIG. 1 is a block diagram of a computing device 10 that comprises a system memory 12, a processor device 14, and a storage device 16 in which examples of object size annotations for memory safety may be practiced. It is to be understood that the computing device 10 in some examples may include constituent elements in addition to those illustrated in FIG. 1. In the example of FIG. 1, the computing device 10 implements a compiler 18 that performs object size annotations for memory safety. The compiler 18 can be a software program that generates machine-readable executable code from higher lever source code instructions that are written to comply with a particular programming language syntax.

The compiler 18 may access a source code instruction file 20 that comprises a file of source code instructions 22 written in a programming language, such as the C or C++ programming language, as non-limiting examples, with the appropriate programming language syntax for the programming language. For instance, the source code instruction file 20 may be one of a plurality of source code files to be compiled by the compiler 18. The compiler 18 can generate an executable file 24 with executable instructions 26 that are executable by the computing device 10 based on the source code instructions 22 in the source code instruction file 20. For instance, the compiler 18 can translate the source code instructions 22 in the source code instruction file 20 that are written in the programming language to the executable instructions 26 in the executable file 24 that are written in another language or include lower-level code, such as assembly code 28 written in an assemble language, object code 30, or machine code 32 of machine language instructions, as non-limiting examples, to be executed by the computing device 10.

Once the source code instruction file 20 is accessed, the compiler 18 can identify an annotation 34 in the source code instruction file 20. In particular, the annotation 34 can identify object size verification instructions 36 that return a memory size 38 of an object 40 that is defined by the source code instructions 22 when the object size verification instructions 36 are executed with the object 40 passed as a reference to the object size verification instructions 36. The memory size 38 may be an exact size in the memory 12 that the object 40 occupies or the memory size 38 may be an accurate estimate of the size in the memory 12 that the object 40 occupies such that the actual amount of memory 12 used by the object 40 is very close to the estimate of the memory size 38.

Attributes specify additional information for the compiler 18 to enforce conditions, optimize code, or perform an action such as code or message generation, and add semantic meaning to the function that the attribute identifies. The annotation 34 may be in a syntax that is identifiable by the compiler 18 as an attribute that describes a function that returns a value related to the annotation. Example syntaxes for the annotation 34 may be "_attribute_(object_size_(obj))" or "[[object_size]]," as non-limiting examples, which can be annotated inline with the definition of the object size verification instructions 36 or above the definition of the object size verification instructions 36. The annotation 34 can be added by a developer of the source code instruction file 20 and can be added above the object size verification instructions 36 to signal to the compiler 18 that the object size verification instructions 36 return the memory size 38 of the object 40 that is passed as a reference to the object size verification instructions 36, allowing the compiler 18 to use the memory size 38 of the object 40 to improve memory safety. The memory size 38 of the object 40 allows for the compiler 18 to know the bounds in the memory 12 that are accessible by the compiler 18 to be used for access validation that ensures an access is within the bounds in the memory 12 for the object 40. The annotation 34 can also be defined along with other annotations so that the compiler 18 recognizes the annotation 34 as an annotation that identifies object size verification instructions that return the memory size of the object that is passed as a reference to the object size verification instructions.

For example, the object size verification instructions 36 may be a function (i.e., source code instructions) in a source code file (e.g., the source code instruction file 20) that can be passed a reference to the object 40 that is defined by the source code instructions 22 and that returns the memory size 38 of the object 40 when the object size verification instructions 36 are executed. In some examples, the reference to the object 40 that is passed to the object size verification instructions 36 may be a pointer, such as in the C or C++ programming language, which can be a variable that stores the memory address of another variable (i.e., the pointer "points to" the variable whose memory address the pointer stores) and can be used to access the variable that the pointer points to. In some examples, the object size verification instructions 36 may be a function (i.e., source code instructions) in a source code file (e.g., the source code instruction file 20) that can be passed a list of parameters 48 and a parameter in the list of parameters 48 may be a reference to the object 40. For example, the list of parameters 48 can be a list of argument numbers that specify pointers and locations of values for the sizes of the argument numbers that the pointers point to. An example of a function "malloc_usable_size" (e.g., the object size verification instructions 36) that returns the size (e.g., the memory size 38) of the pointer "ptr" (e.g., the object 40) that is passed to the function is below:

```
size_t [[object_size]] malloc_usable_size (void *ptr) {
  if (!pointer_is_managed (ptr))
    return -1;
  // Return the size stored at the end of the object.
  return *((size_t *) (mem + sz));
}
```

The annotation 34 "[[object_size]]" inline to the function "malloc_usable_size" allows the compiler 18 to recognize the function "malloc_usable_size" as a function that returns the memory size 38 of the object 40 "ptr" that is passed to the function.

In some implementations, the annotation 34 can be identified or written in a header file 42 that is associated with the source code instruction file 20. The header file 42 can include a declaration of the object size verification instructions 36, such as a declaration that specifies one or more of a name, type, or other characteristic of the object size verification instructions 36. Each source code instruction file that contains a function with an annotation can have a corresponding header file at the top of the source code instruction file with a declaration of the function. The annotation 34 can additionally be identified or written in the source code instruction file 20 where the object size verification instructions are defined, such as above the object size verification instructions 36 when the source code instruction file 20 includes the object size verification instructions 36. With the inclusion of the header file 42, the compiler 18 can associate the declaration for the object size verification instructions 36 with the annotation 34 in the header file 42 with all of the uses of the object size verification instructions 36 in the source code instruction file 20, as well as lines in the source code instruction file 20 where calls to the object size verification instructions 36 could be generated. In some examples, the object size verification instructions 36 may be in the source code instructions 22 in the source code instruction file 20, and in other implementations, the object size verification instructions 36 may be in source code instructions of another source code file to be compiled by the compiler 18. For instance, the annotation 34 can be identified in a source code file that includes the object size verification instructions 36 and that is not the source code instruction file 20, and a header file that corresponds to the source code file can include a declaration of the object size verification instructions 36 with the annotation 34.

The compiler 18 can identify source code instructions that access the object 40 by parsing the source code instructions 22 in the source code instruction file 20 or by parsing source code instructions in another source code file that is being compiled by the compiler 18 to generate parsed source code instructions 44. A parser 46 can be used to parse the source code instructions to generate parsed source code instructions 44. The compiler 18 can detect the source code instructions that access the object 40 based on the parsed source code instructions 44 and the annotation 34, such as by reading the parsed source code instructions 44 to identify instructions that use the object 40 that is passed to the object size verification instructions 36 that are identified by the annotation 34. In examples where the reference to the object 40 is a pointer, the compiler 18 can identify the source code instructions that access the object 40 by identifying an instruction in the source code instructions or the parsed source code instructions 44, such as a function call, that is passed a reference to the pointer. Continuing with the function "malloc_usable_size" example, the compiler 18 can identify the below function (e.g., source code instructions) as being a function that uses the object 40 "ptr":

```
void func (void *ptr) {
  // Copy size bytes into ptr.
  memcpy (ptr, src, size);
}
```

The compiler 18 can inject the executable instructions 26 into the executable file 24. The executable instructions 26 can cause the object size verification instructions 36 to be executed. Executing the object size verification instructions 36 allows the compiler 18 to determine the memory size 38 of the object 40 and to condition access to the object 40 on a value 50 that is returned by the object size verification instructions 36. For instance, the compiler 18 can inject executable instructions 26 that include a condition 52 that returns an error 54 when the access to the object 40 is outside the memory size 38 of the object 40, such as when the value 50 that is returned by the object size verification instructions 36 is greater than the memory size 38 of the object 40. The error 54 may be a compiler warning or a runtime error, as non-limiting examples. For example, executing the object size verification instructions 36 that return the memory size 38 for the object 40 can output a memory size 38 of 48 bytes for the object 40 in the memory 12 and the compiler 18 can generate the executable instructions 26 to include the condition 52 that returns the error 54 when an access to the object 40 that is more than 48 bytes.

Injecting the executable instructions 26 in the executable file 24 can include generating the executable instructions 26 that condition the access to the object 40 on the value 50 returned by the object size verification instructions 36. The condition 52 can be instructions in the executable instructions 26 that return an error 54 when a size of the object 40 is greater than the value 50 returned by the object size verification instructions 36. For example, the condition 52 can be a conditional statement in the executable instructions 26 that returns the error 54 in the form of an error message and, in some implementations, stops the execution of the executable instructions 26. The compiler 18 can write the executable instructions 26 with the condition 52 in the executable file 24.

Continuing with the function "malloc_usable_size" example, the compiler 18 can inject executable instructions 26 into the executable file 24 that send an alert of "Invalid write beyond bounds" (e.g., the error 54) and stop execution when the size of the object 40 "ptr", the size represented as the value 50 returned by the object size verification instructions 36 "malloc_usable_size" when executed, is beyond the memory size 38 of the object 40:

```
void func (void *ptr) {
   if (size > malloc_usable_size (ptr))
      alert_and_abort ("*** Invalid write beyond bounds ***");
   memcpy (ptr, src, size);
}
```

The object 40 can be accessed when the executable instructions 26 are executed and the condition 52 passes such that the error 54 is not thrown. For instance, the compiler 18 can cause the object size verification instructions 36 to be passed a reference to the object 40 and the object size verification instructions 36 to be executed. The compiler 18 can determine, based on the value 50 and the size of the object 40, that the access to the object 40 is beyond the memory size 38 of the object 40 when the size of the object 40 is greater than the value 50 returned by the object size verification instructions 36, and the compiler 18 can return the error 54.

It is to be understood that, because the compiler 18 is a component of the computing device 10, functionality implemented by the compiler 18 may be attributed to the computing device 10 generally. Moreover, in examples where the compiler 18 comprises software instructions that program the processor device 14 to carry out functionality discussed herein, functionality implemented by the compiler 18 may be attributed herein to the processor device 14. It is to be further understood that while, for purposes of illustration only, the compiler 18 is depicted as a single component, the functionality implemented by the compiler 18 may be implemented in any number of components, and the examples discussed herein are not limited to any particular number of components.

Figure 2:
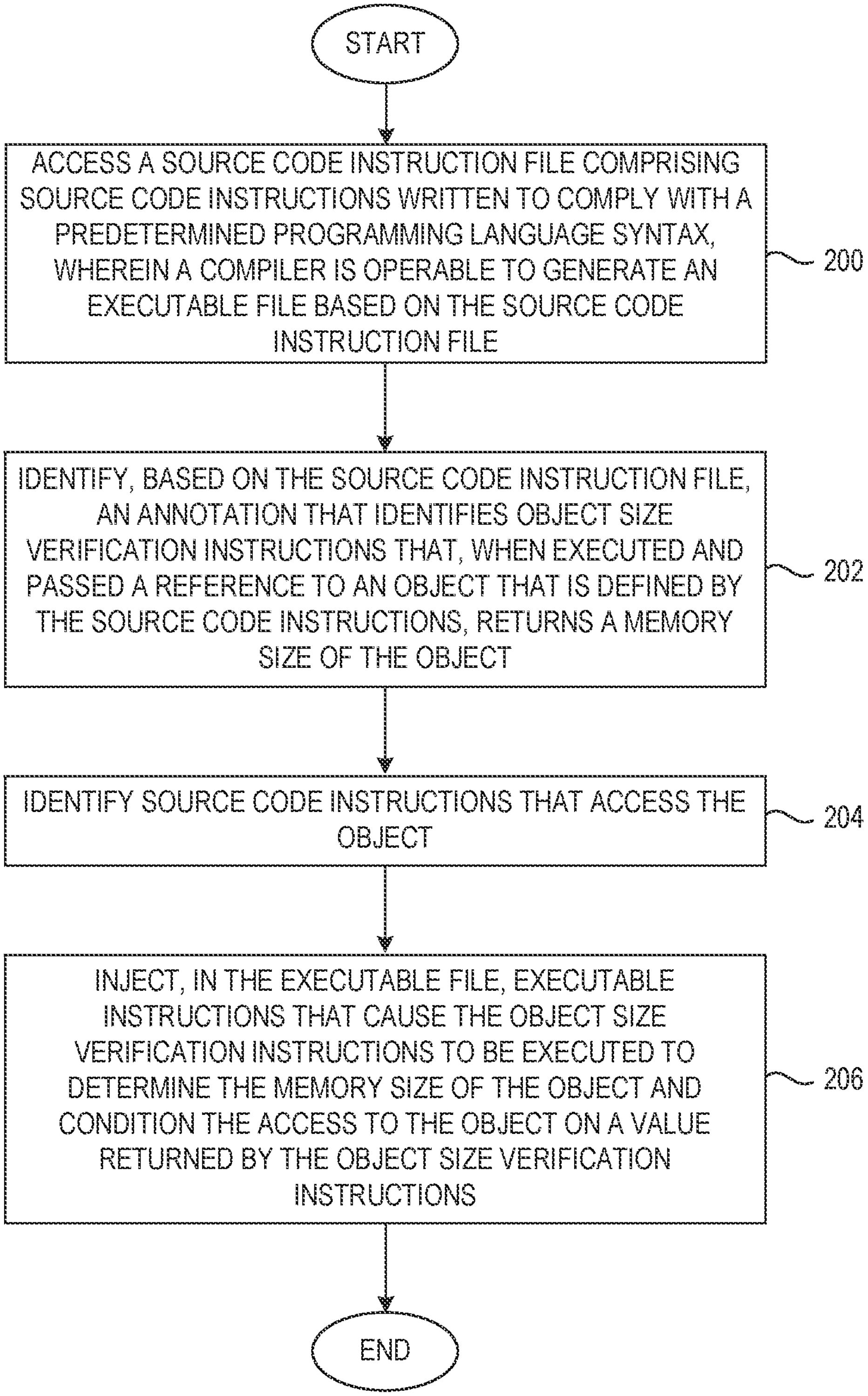
FIG. 2 is a flowchart illustrating operations performed by the computing device of FIG. 1 for object size annotations for memory safety, according to one example.

FIG. 2 is a flowchart illustrating operations performed by the computing device of FIG. 1 for object size annotations for memory safety, according to one example. Elements of FIG. 1 are referenced in describing FIG. 2 for the sake of clarity. In FIG. 2, operations begin with a processor device of a computing device, such as the processor device 14 of the computing device 10 of FIG. 1, the processor device 14 to access a source code instruction file comprising source code instructions written to comply with a predetermined programming language syntax, wherein a compiler is operable to generate an executable file based on the source code instruction file (block 200). The processor device 14 is further to identify, based on the source code instruction file, an annotation that identifies object size verification instructions that, when executed and passed a reference to an object that is defined by the source code instructions, returns a memory size of the object (block 202). The processor device 14 is further to identify source code instructions that access the object (block 204). The processor device 14 is further to inject, in the executable file, executable instructions that cause the object size verification instructions to be executed to determine the memory size of the object and condition the access to the object on a value returned by the object size verification instructions (block 206).

Figure 3:
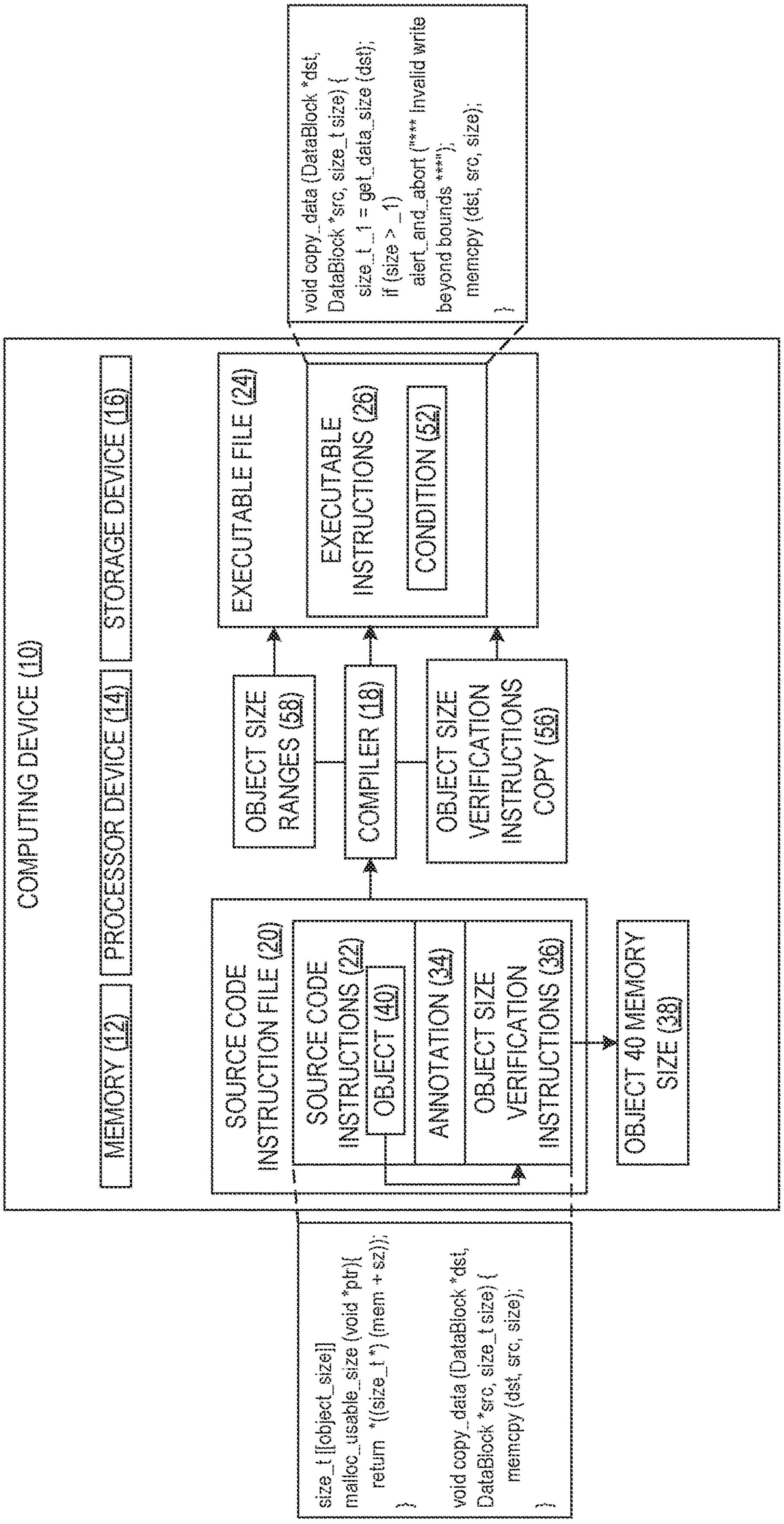
FIG. 3 is a block diagram of the computing device of FIG. 1 for object size annotations for memory safety, according to one example.

FIG. 3 is a block diagram of the computing device of FIG. 1 for object size annotations for memory safety, according to one example. Elements of FIG. 1 are referenced in describing FIG. 3 for the sake of clarity. In the example of FIG. 3, the compiler 18 may inject the executable instructions 26 in the executable file 24 by writing a copy 56 of the object size verification instructions 36 to the executable instructions 26. The compiler 18 can then execute the copy 56 of the object size verification instructions 36 to determine the value 50 and determine whether access to the object 40 is beyond the memory size 38 of the object 40, where the access to the object 40 is beyond the memory size 38 of the object 40 and triggers the condition 52 when the size of the object 40 exceeds the value 50 returned by the copy 56 of the object size verification instructions 36.

Value range propagation can be used by the compiler 18 to determine the subranges that a variable can contain and eliminate redundant calculations based on the subranges, which can optimize the program being compiled to be smaller and faster. In some examples, the compiler 18 can determine a range 58 of values for the size of the object 40 in the source code instructions that access the object 40, and the executable instructions 26 in the executable file 24 can be based on the range 58 of values for the size of the object 40. For instance, with value range propagation, the compiler 18 can determine the range 58 of values of each variable at the point of use, which can be used at compile time when an access is safe. For example, the function "copy_data"

```
void copy_data (DataBlock *dst, DataBlock *src, size_t size) {
   memcpy (dst, src, size);
}
```

can be transformed by the compiler 18 to:

```
void copy_data (DataBlock *dst, DataBlock *src, size_t size) {
   size_t _1 = get_data_size (dst);
   if (size > _1)
      alert_and_abort ("*** Invalid write beyond bounds ***");
   memcpy (dst, src, size);
}
```

Then, the compiler 18 may use value range propagation to find the range 58 of "size" and "_1" at the following function call:

```
void some_function (...) {
  ...
  // Prompt user for destination size. The range of a short is 0 - 32768.
  unsigned short dstsize = get_size_from_user ( );
  // Source is 64K.
  size_t srcsize = 64*1024;
  DataBlock *dst = allocate (srcsize);
  DataBlock *src = allocate (dstsize);
  ...
  copy_data (dst, src, get_data_size (src));
  ...
}
```

to find that the range 58 of "size" and "_1" at the "some_function" call are [0, 32767] and [65536, 65536], respectively. In the context of the "copy_data" function, a "size>_1" will be true for any permitted value in the range 58 of the "size" and "_1" variables, which allows the compiler 18 to determine at compile time that the "alert_and_abort" condition 52 will always be called.

The visibility of the context inside the "copy_data" function (i.e., finding that the comparison of "size>_1" will always be true and the "alert_and_abort" function will always be called) can happen by using inlining or interprocedural analysis (IPA). Inlining is an optimization technique where the compiler 18 can copy code from a function directly into the code of the calling function rather than creating a separate set of instructions in memory. For instance, when inlining, the call to the "copy_data" function can be replaced by the contents of the "copy_data" function. When using IPA, the compiler 18 can look into the "copy_data" function and analyze it alongside the function that the compiler 18 is currently compiling. In both cases, the compiler 18 can then send a warning that the code is unsafe.

For example, when inlining, the compiler 18 may transform the "some_function" function to:

```
void some__function (...) {
   ...
   // Prompt user for destination size. The range of a short is 0 - 32768.
   unsigned short dstsize = get__size__from__user ( );
   // Source is 64K.
   size__t srcsize = 64*1024;
   DataBlock *dst = allocate (srcsize);
   DataBlock *src = allocate (dstsize);
   size__t__1 = get__data__size (dst);
   size__t size = get__data__size (src);
   ...
   if (size > __1)
      alert and abort ("*** Invalid write beyond bounds ***");
   memcpy (dst, src, size);
   ...
}
```

Because "size>_1" is always true based on the value range propagation, the compiler 18 may choose to, in addition to sending the warning that the code is unsafe, remove the calls to the "memcpy" function. Additionally, if the "alert_and_abort" function is a no-return type of function (i.e., it will terminate the program and not execute lines of code after the condition in the function), then the compiler 18 can remove all of the code that occurs after the condition. As a result, the "some_function" function then becomes:

```
void some__function (...) {
   ...
   // Prompt user for destination size. The range of a short is 0 - 32768.
   unsigned short dstsize = get__size__from__user ( );
   // Source is 64K.
   size__t srcsize = 64*1024;
   DataBlock *dst = allocate (srcsize);
   DataBlock *src = allocate (dstsize);
   size__t__1 = get__data__size (dst);
   size__t size = get__data__size (src);
   ...
   alert__and__abort ("*** Invalid write beyond bounds ***");
}
```

If the "some_function" function is edited to instead include "copy_data (dst, src, get_data_size (dst))," then the compiler 18 can conclude that the function call to "some_function" is always safe and can transform the "some_function" function to:

```
void some__function (...) {
   ...
   // Prompt user for destination size. The range of a short is 0 - 32768.
   unsigned short dstsize = get__size__from__user ( );
   // Source is 64K.
   size__t srcsize = 64*1024;
   DataBlock *dst = allocate (srcsize);
   DataBlock *src = allocate (dstsize);
   size__t__1 = get__data__size (dst);
   size__t size = get__data__size (src);
   ...
   memcpy (dst, src, size);
   ...
}
```

In this example, the "alert_and_abort" function will not be called because the code is memory safe.

Figure 4:
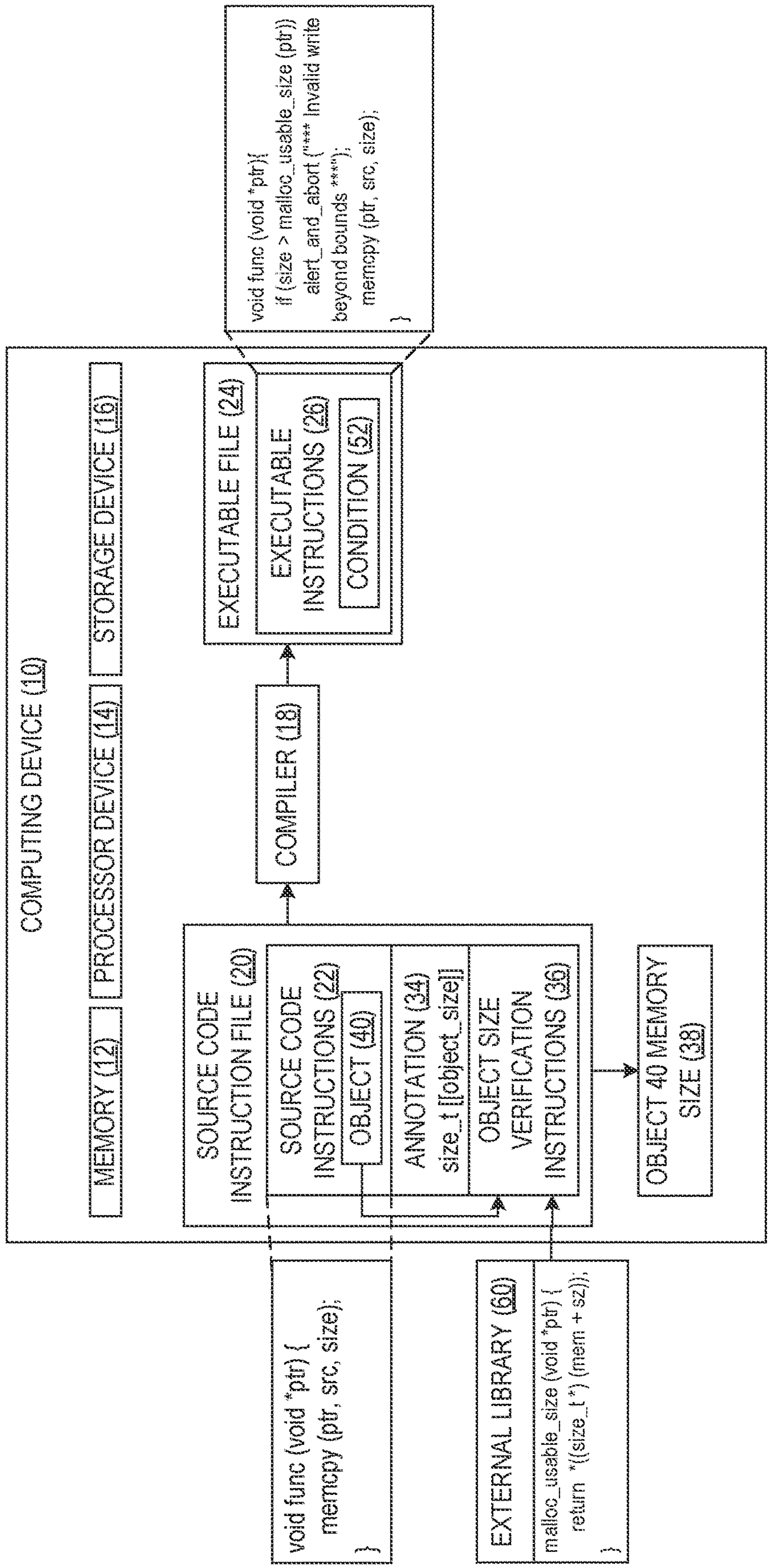
FIG. 4 is a block diagram of the computing device of FIG. 1 for object size annotations for memory safety, according to one example.

FIG. 4 is a block diagram of the computing device of FIG. 1 for object size annotations for memory safety, according to one example. Elements of FIG. 1 are referenced in describing FIG. 4 for the sake of clarity. In the example of FIG. 4, the object size verification instructions 36 may be a function call to a function in an external library 60. For example, the object size verification instructions 36 may be a function defined in the external library 60. When the object size verification instructions 36 are in the external library 60, the compiler 18 can identify a declaration of the object size verification instructions 36 through an included header file and generate calls to those object size verification instructions 36. The compiler 18 can access the external library 60 and execute the executable instructions 26 to cause the object size verification instructions 36 in the external library 60 to be executed to determine the memory size 38 of the object 40. In some examples, a copy of the object size verification instructions 36 in the external library 60 may be added to the executable instructions 26 in the executable file 24 and the copy can be executed to determine the value 50 and whether access to the object 40 is memory safe.

Figure 5:
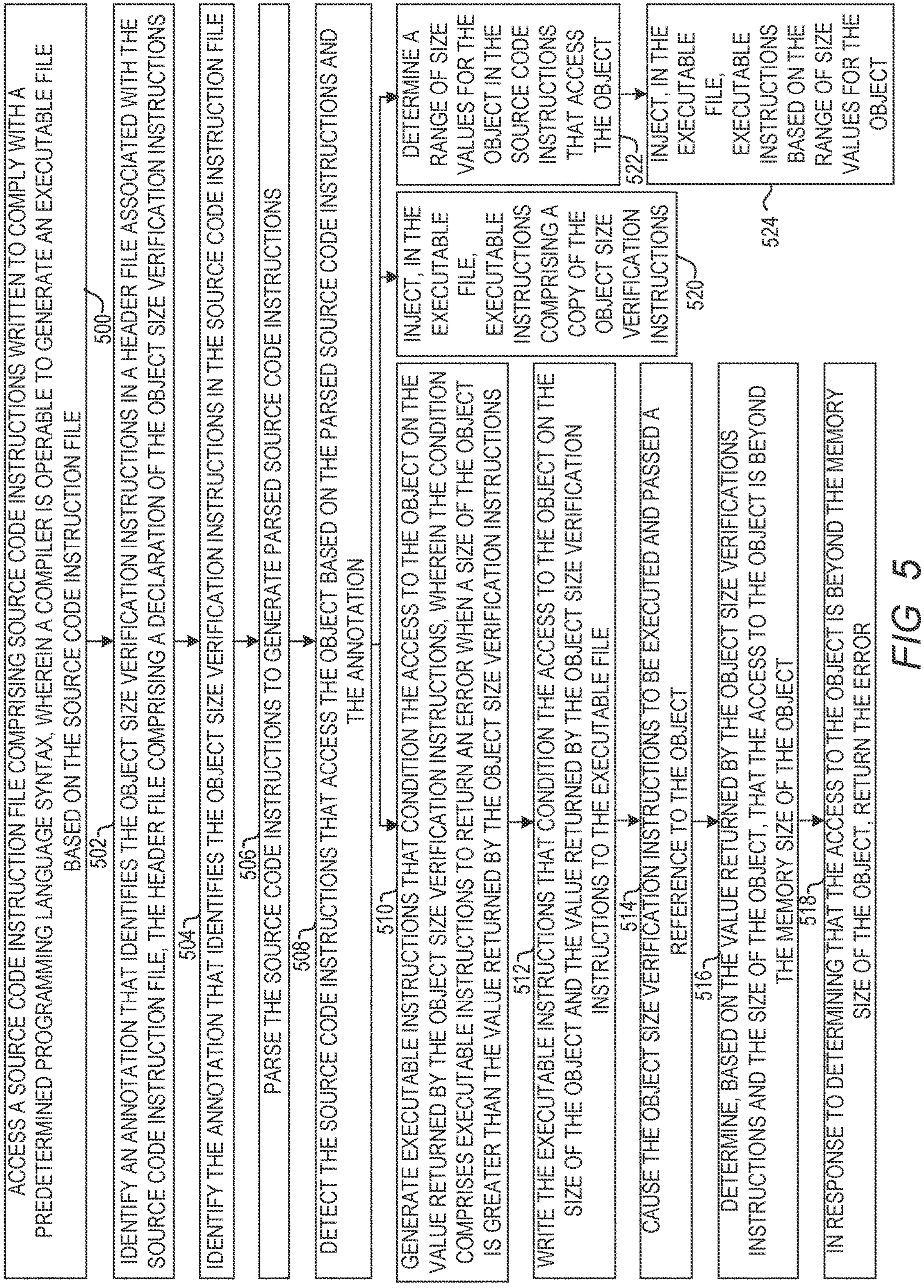
FIG. 5 is a flowchart illustrating operations performed by the computing device of FIG. 1 for object size annotations for memory safety, according to one example.

FIG. 5 is a flowchart illustrating operations performed by the computing device of FIG. 1 for object size annotations for memory safety, according to one example. Elements of FIG. 1 are referenced in describing FIG. 5 for the sake of clarity. In the example of FIG. 5, operations begin with a processor device of a computing device, such as the processor device 14 of the computing device 10 of FIG. 1, the processor device 14 to access a source code instruction file comprising source code instructions written to comply with a predetermined programming language syntax, wherein a compiler is operable to generate an executable file based on the source code instruction file (block 500). The processor device 14 is further to identify an annotation that identifies the object size verification instructions in a header file associated with the source code instruction file, the header file comprising a declaration of the object size verification instructions (block 502). The processor device 14 is further to identify the annotation that identifies the object size verification instructions in the source code instruction file (block 504). The processor device 14 is further to parse the source code instructions to generate parsed source code instructions (block 506). The processor device 14 is further to detect the source code instructions that access the object based on the parsed source code instructions and the annotation (block 508). In some implementations, the processor device 14 is further to inject, in the executable file, executable instructions comprising a copy of the object size verification instructions (block 520).

In some implementations, the processor device 14 is further to generate executable instructions that condition the access to the object on the value returned by the object size verification instructions, wherein the condition comprises executable instructions to return an error when a size of the object is greater than the value returned by the object size verification instructions (block 510). The processor device 14 is further to write the executable instructions that condition the access to the object on the size of the object and the value returned by the object size verification instructions to the executable file (block 512). The processor device 14 is further to cause the object size verification instructions to be executed and passed a reference to the object, wherein the object size verification instructions return a memory size of the object (block 514). The processor device 14 is further to determine, based on the memory size of the object and the size of the object, that the access to the object is beyond the memory size of the object (block 516). The processor device 14 is further to, in response to determining that the access to the object is beyond the memory size of the object, return the error (block 518).

In some implementations, the processor device 14 is further to determine a range of size values for the object in the source code instructions that access the object (block 522). The processor device 14 is further to inject, in the executable file, executable instructions based on the range of size values for the object (block 524).

Figure 6:
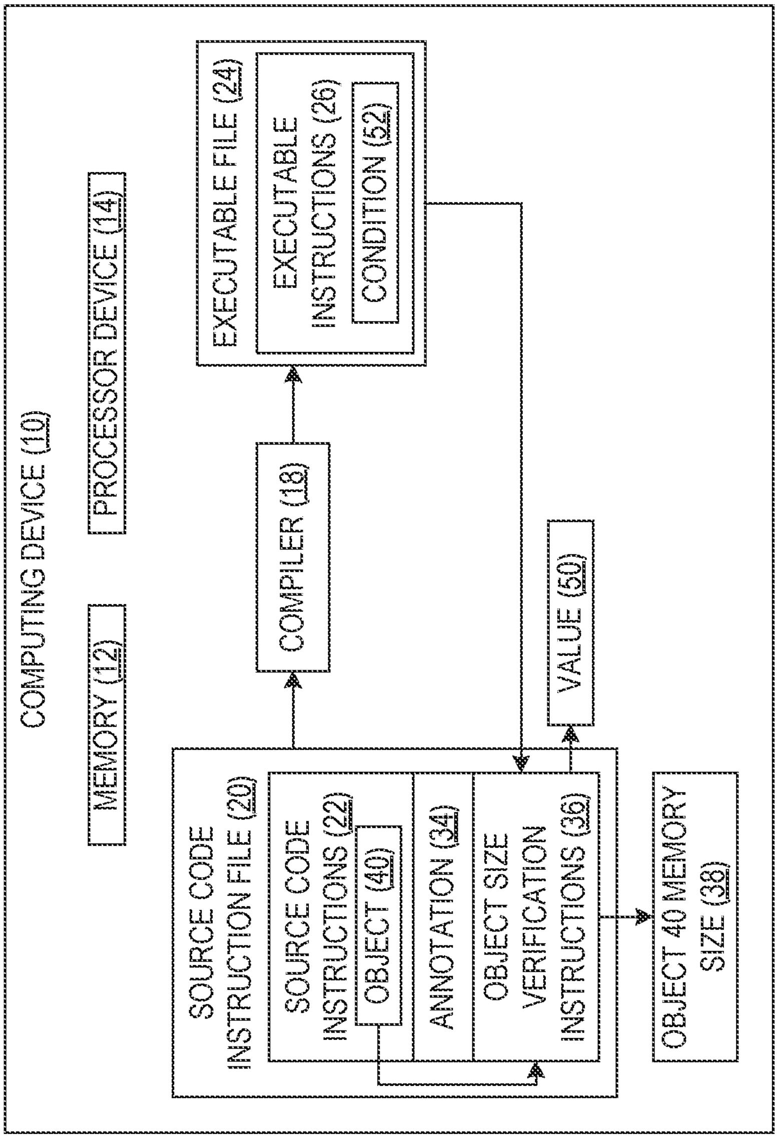
FIG. 6 is a block diagram of the computing device of FIG. 1 for object size annotations for memory safety, according to one example.

FIG. 6 is a simpler block diagram of the computing device of FIG. 1 for object size annotations for memory safety, according to one example. Elements of FIG. 1 are referenced in describing FIG. 6 for the sake of clarity. In the example of FIG. 6, the computing device 10 includes a compiler 18 and a system memory 12 and a processor device 14 coupled to the system memory 12. The processor device 14 is to access a source code instruction file 20 comprising source code instructions 22 written to comply with a predetermined programming language syntax, wherein a compiler 18 is operable to generate an executable file 24 based on the source code instruction file 20. The processor device 14 is further to identify, based on the source code instruction file 20, an annotation 34 that identifies object size verification instructions 36 that, when executed and passed a reference to an object 40 that is defined by the source code instructions 22, returns a memory size 38 of the object 40. The processor device 14 is further to identify source code instructions that access the object 40. The processor device 14 is further to inject, in the executable file 24, executable instructions 26 that cause the object size verification instructions 36 to be executed to determine the memory size 38 of the object 40 and condition 52 the access to the object 40 on a value 50 returned by the object size verification instructions 36.

Figure 7:
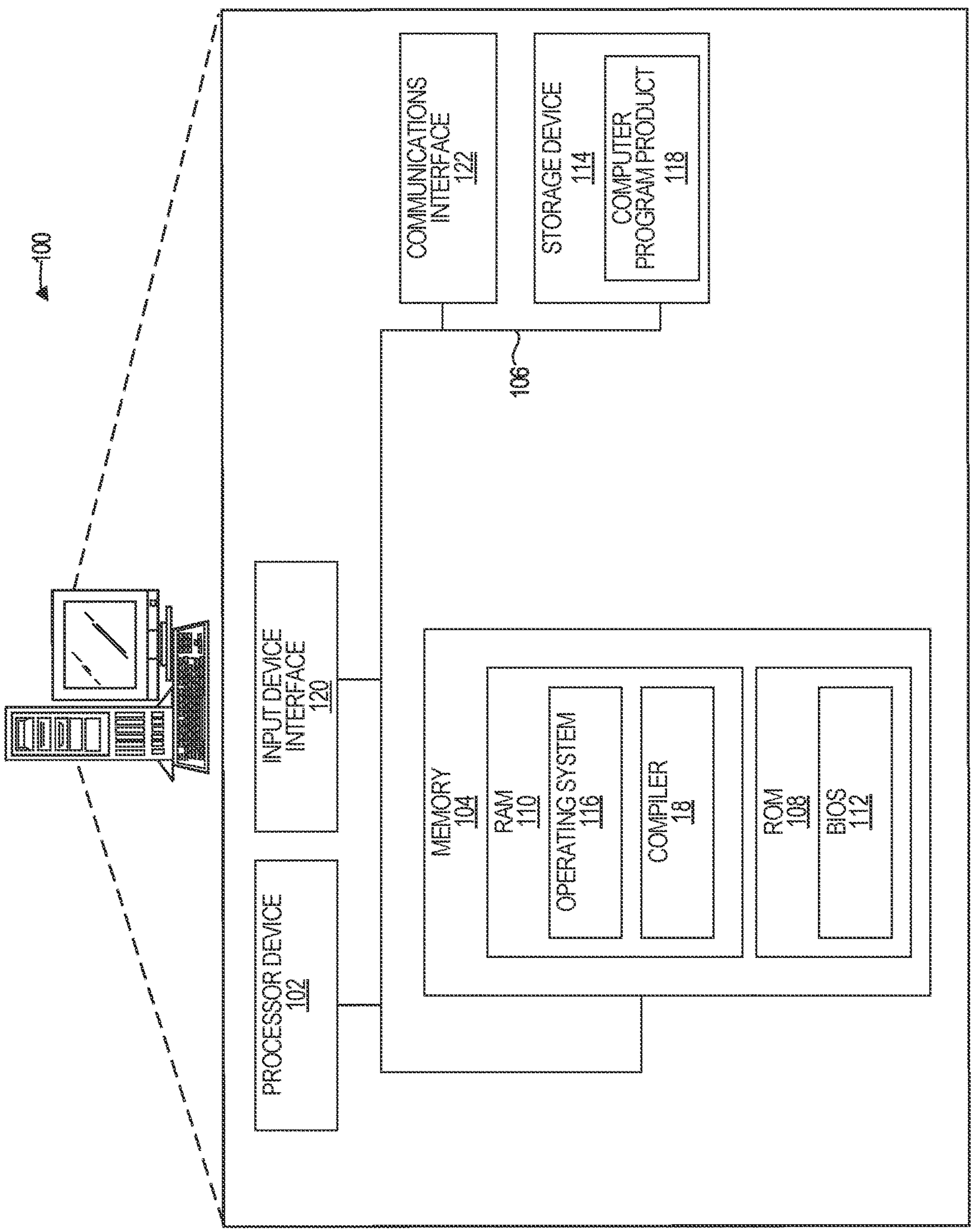
FIG. 7 is a block diagram of a computing device suitable for implementing examples, according to one example.

FIG. 7 is a block diagram of a computing device 100, such as the computing device 10 of FIG. 1, suitable for implementing examples according to one example. The computing device 100 may comprise any computing or electronic device capable of including firmware, hardware, and/or executing software instructions to implement the functionality described herein. The computing device 100 includes a processor device 102, such as the processor device 14, a system memory 104, such as the system memory 12, and a system bus 106. The system bus 106 provides an interface for system components including, but not limited to, the system memory 104 and the processor device 102. The processor device 102 can be any commercially available or proprietary processor.

The system bus 106 may be any of several types of bus structures that may further interconnect to a memory bus (with or without a memory controller), a peripheral bus, and/or a local bus using any of a variety of commercially available bus architectures. The system memory 104 may include non-volatile memory 108 (e.g., read-only memory (ROM), erasable programmable read-only memory (EPROM), electrically erasable programmable read-only memory (EEPROM), etc.), and volatile memory 110 (e.g., random-access memory (RAM)). A basic input/output system (BIOS) 112 may be stored in the non-volatile memory 108 and can include the basic routines that help to transfer information between elements within the computing device 100. The volatile memory 110 may also include a high-speed RAM, such as static RAM, for caching data.

The computing device 100 may further include or be coupled to a non-transitory computer-readable storage medium such as a storage device 114, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 114 and other drives associated with computer-readable media and computer-usable media may provide non-volatile storage of data, data structures, computer-executable instructions, and the like.

A number of modules can be stored in the storage device 114 and in the volatile memory 110, including an operating system 116 and one or more program modules, such as the compiler 18, which may implement the functionality described herein in whole or in part. All or a portion of the examples may be implemented as a computer program product 118 stored on a transitory or non-transitory computer-usable or computer-readable storage medium, such as the storage device 114, which includes complex programming instructions, such as complex computer-readable program code, to cause the processor device 102 to carry out the steps described herein. Thus, the computer-readable program code can comprise software instructions for implementing the functionality of the examples described herein when executed on the processor device 102. The processor device 102, in conjunction with the compiler 18 in the volatile memory 110, may serve as a controller, or control system, for the computing device 100 that is to implement the functionality described herein.

An operator, such as a user, may also be able to enter one or more configuration commands through a keyboard (not illustrated), a pointing device such as a mouse (not illustrated), or a touch-sensitive surface such as a display device (not illustrated). Such input devices may be connected to the processor device 102 through an input device interface 120 that is coupled to the system bus 106 but can be connected by other interfaces such as a parallel port, an Institute of Electrical and Electronic Engineers (IEEE) 1394 serial port, a Universal Serial Bus (USB) port, an IR interface, and the like. The computing device 100 may also include a communications interface 122 suitable for communicating with the network as appropriate or desired. The computing device 100 may also include a video port (not illustrated) configured to interface with the display device (not illustrated), to provide information to the user.

Individuals will recognize improvements and modifications to the preferred examples of the disclosure. All such improvements and modifications are considered within the scope of the concepts disclosed herein and the claims that follow.

What is claimed is:

1. A method, comprising:

accessing, by a compiler executing on a computing device, a source code instruction file comprising source code instructions written to comply with a predetermined programming language syntax, the compiler operable to generate an executable file based on the source code instruction file;

identifying, by the compiler based on the source code instruction file, an annotation that identifies object size verification instructions that, when executed and passed a reference to an object that is defined by the source code instructions, returns a memory size of the object;

identifying, by the compiler, source code instructions that access the object; and injecting, by the compiler, in the executable file, executable instructions that cause the object size verification instructions to be executed to determine the memory size of the object and condition the access to the object on a value returned by the object size verification instructions.

2. The method of claim 1, wherein identifying, based on the source code instruction file, the annotation that identifies the object size verification instructions comprises:

identifying the annotation that identifies the object size verification instructions in a header file associated with the source code instruction file, the header file comprising a declaration of the object size verification instructions; and identifying the annotation that identifies the object size verification instructions in the source code instruction file.

3. The method of claim 1, wherein identifying the source code instructions that access the object comprises:

parsing, by the compiler, the source code instructions to generate parsed source code instructions; and detecting, by the compiler, the source code instructions that access the object based on the parsed source code instructions and the annotation.

4. The method of claim 1, wherein injecting, in the executable file, the executable instructions comprises:

generating executable instructions that condition the access to the object on the value returned by the object size verification instructions, wherein the condition comprises executable instructions to return an error when a size of the object is greater than the value returned by the object size verification instructions; and writing the executable instructions that condition the access to the object on the size of the object and the value returned by the object size verification instructions to the executable file.

5. The method of claim 4, further comprising:

causing the object size verification instructions to be executed and passed a reference to the object;

determining, based on the value returned by the object size verification instructions and the size of the object, that the access to the object is beyond the memory size of the object; and in response to determining that the access to the object is beyond the memory size of the object, returning the error.

6. The method of claim 1, wherein injecting, in the executable file, the executable instructions comprises:

injecting, in the executable file, executable instructions comprising a copy of the object size verification instructions.

7. The method of claim 1, wherein injecting, in the executable file, the executable instructions comprises:

determining a range of size values for the object in the source code instructions that access the object; and injecting, in the executable file, executable instructions based on the range of size values for the object.

8. The method of claim 1, wherein the reference to the object that is defined by the source code instructions comprises a pointer to the object.

9. The method of claim 8, wherein identifying source code instructions that access the object comprises identifying source code instructions that are passed a reference to the pointer.

10. The method of claim 1, wherein the object size verification instructions are passed a list of parameters, wherein a parameter of the parameters comprises the reference to the object.

11. The method of claim 1, wherein the executable file comprises assembly code, object code, or machine code.

12. The method of claim 1, wherein the object size verification instructions comprise a function call to a function in an external library identified in the annotation.

13. The method of claim 1, wherein the memory size of the object comprises an estimated memory size of the object.

14. A computing device, comprising:

a memory; and a processor device coupled to the memory, the processor device to:

access a source code instruction file comprising source code instructions written to comply with a predetermined programming language syntax, wherein a compiler is operable to generate an executable file based on the source code instruction file;

identify, based on the source code instruction file, an annotation that identifies object size verification instructions that, when executed and passed a reference to an object that is defined by the source code instructions, returns a memory size of the object;

identify source code instructions that access the object; and inject, in the executable file, executable instructions that cause the object size verification instructions to be executed to determine the memory size of the object and condition the access to the object on a value returned by the object size verification instructions.

15. The computing device of claim 14, wherein, to identify, based on the source code instruction file, the annotation that identifies the object size verification instructions, the processor device is further to:

identify the annotation that identifies the object size verification instructions in a header file associated with the source code instruction file, the header file comprising a declaration of the object size verification instructions; and identify the annotation that identifies the object size verification instructions in the source code instruction file.

16. The computing device of claim 14, wherein, to identify the source code instructions that access the object, the processor device is further to:

parse the source code instructions to generate parsed source code instructions; and detect the source code instructions that access the object based on the parsed source code instructions and the annotation.

17. The computing device of claim 14, wherein, to inject, in the executable file, the executable instructions, the processor device is further to:

generate executable instructions that condition the access to the object on the value returned by the object size verification instructions, wherein the condition comprises executable instructions to return an error when a size of the object is greater than the value returned by the object size verification instructions; and write the executable instructions that condition the access to the object on the size of the object and the value returned by the object size verification instructions to the executable file.

18. A non-transitory computer-readable storage medium that includes computer-executable instructions that, when executed, cause one or more processor devices to:

access a source code instruction file comprising source code instructions written to comply with a predetermined programming language syntax, wherein a compiler is operable to generate an executable file based on the source code instruction file;

identify, based on the source code instruction file, an annotation that identifies object size verification instructions that, when executed and passed a reference to an object that is defined by the source code instructions, returns a memory size of the object;

identify source code instructions that access the object; and inject, in the executable file, executable instructions that cause the object size verification instructions to be executed to determine the memory size of the object and condition the access to the object on a value returned by the object size verification instructions.

19. The non-transitory computer-readable storage medium of claim 18, wherein, to identify, based on the source code instruction file, the annotation that identifies the object size verification instructions, the instructions are further to cause the processor device to:

identify the annotation that identifies the object size verification instructions in a header file associated with the source code instruction file, the header file comprising a declaration of the object size verification instructions; and identify the annotation that identifies the object size verification instructions in the source code instruction file.

20. The non-transitory computer-readable storage medium of claim 18, wherein, to identify the source code instructions that access the object, the instructions are further to cause the processor device to:

parse the source code instructions to generate parsed source code instructions; and detect the source code instructions that access the object based on the parsed source code instructions and the annotation.

* * * * *